US012753802B2

(12) United States Patent
Everly

(10) Patent No.: US 12,753,802 B2
(45) Date of Patent: Oct. 6, 2026

(54) TRANSFER CASE YOKE

(71) Applicant: Jeff Everly, Chandler, IN (US)

(72) Inventor: Jeff Everly, Chandler, IN (US)

( * ) Notice: Subject to any disclaimer, the term of this patent is extended or adjusted under 35 U.S.C. 154(b) by 283 days.

(21) Appl. No.: 18/731,274

(22) Filed: Jun. 1, 2024

(65) Prior Publication Data

US 2024/0401647 A1 Dec. 5, 2024

Related U.S. Application Data

(63) Continuation-in-part of application No. 17/500,547, filed on Oct. 13, 2021, now Pat. No. 12,000,439.

(Continued)

(51) Int. Cl.

*F16D 1/076* (2006.01)
*F16D 1/10* (2006.01)

(Continued)

(52) U.S. Cl.

CPC .............. *F16D 1/076* (2013.01); *F16D 1/116* (2013.01); *F16D 3/387* (2013.01); *F16D 2001/103* (2013.01)

(58) Field of Classification Search

CPC ...... F16B 21/18; F16B 21/183; F16B 21/186; F16B 35/005; F16B 2200/506;

(Continued)

(56) References Cited

U.S. PATENT DOCUMENTS 103,423 A * 5/1870 Brown .................... F16L 47/04 403/337
1,612,322 A 12/1926 Spicer (Continued)

FOREIGN PATENT DOCUMENTS

DE 1945627 3/1970
DE 2950637 6/1981
DE 10008183 12/2001

OTHER PUBLICATIONS

Dana Spicer, "Companion Flanges J300P-1", (Aug. 2001) (available at http://www.billavista.com/tech/pdf_index/files/Driveline%20and%20Driveshaft/Spicer%20Driveline%20Components%20Catalog%20-%20Companion%20Flanges%20(J300P-1).pdf, last accessed May 14, 2025).

(Continued)

*Primary Examiner* — Josh Skroupa

(74) *Attorney, Agent, or Firm* — McDonald Hopkins LLC; James P. Muraff

(57) ABSTRACT

A yoke for a transfer case output shaft includes a hollow cylindrical sleeve portion and a disc-shaped flange portion extending radially from an outer portion of the sleeve portion. The sleeve portion includes a plurality of inwardly extending splines configured to engage outwardly extending splines of the output shaft. The flange portion has a plurality of fastener openings therethrough that correspond to fastener openings through a flange portion of a companion flange. A notch is formed through the sleeve portion at an open end thereof. A groove is formed within the inner surface of the sleeve portion and extends about a rotation axis of the sleeve portion. A C-clip is received within the groove for restricting axial movement and includes open ends that are received within the notch. A threaded fastener passes through an opening of the yoke and/or the companion flange and engages the output shaft.

19 Claims, 4 Drawing Sheets

Related U.S. Application Data

(60) Provisional application No. 63/091,029, filed on Oct. 13, 2020.

(51) Int. Cl.
*F16D 1/116* (2006.01)
*F16D 3/38* (2006.01)

(58) Field of Classification Search
CPC ........ F16D 1/033; F16D 1/076; F16D 1/0847; F16D 3/387; F16D 2001/103; Y10T 403/645; Y10T 403/7033; Y10T 403/7035; Y10T 403/7041
USPC .............. 464/134, 135, 182; 403/337, 359.5, 403/359.6, 362
See application file for complete search history.

(56) References Cited

U.S. PATENT DOCUMENTS

| | | | | |
|---|---|---|---|---|
| 2,140,723 | A | 12/1938 | Spicer | |
| 2,300,658 | A * | 11/1942 | Dunn | F16D 3/387 464/130 |
| 2,691,283 | A * | 10/1954 | Stover | F16D 3/387 464/180 |
| 4,544,054 | A * | 10/1985 | Brown | F16D 1/0847 403/362 |
| 6,561,720 | B2 | 5/2003 | Wirth | |
| 6,582,151 | B2 | 6/2003 | Hopson | |
| 7,029,398 | B1 | 4/2006 | Burnard | |
| 7,213,999 | B2 | 5/2007 | Haas | |
| 7,314,416 | B2 | 1/2008 | Loughrin | |
| 7,614,818 | B2 * | 11/2009 | Gutierrez | F16D 1/116 403/359.6 |
| 7,722,089 | B2 | 5/2010 | Nauer | |
| 10,378,590 | B2 | 8/2019 | Reed, Jr. et al. | |
| 11,598,376 | B2 | 3/2023 | Hopson | |
| 12,000,439 | B2 * | 6/2024 | Everly | F16D 1/076 |
| 2005/0277480 | A1 * | 12/2005 | Breese | F16D 1/076 464/179 |
| 2009/0102152 | A1 | 4/2009 | Wallace | |
| 2018/0142735 | A1 * | 5/2018 | Rode | F16D 1/076 |
| 2018/0320742 | A1 | 11/2018 | Hopson | |

OTHER PUBLICATIONS

Dana Spicer, "Driveline Components Catalog Flange Yokes J300P-2", (Mar. 2012) (available at https://d3qx1uccksbb2n.cloudfront.net/docs/j300-p2.pdf last accessed May 14, 2025).
Clarkefire, "Option, Companion Flanges for listed and non-listed driveshafts", (available at https://www.clarkefire.com/docs/default-source/default-document-library/option_companion-flange_non-listed_d621.pdf?sfvrsn=d7c35313_8 last accessed May 14, 2025).
Powertrain Industries Driveline Solutions, "2017 Components Parts Catalog", (Last updated May 18, 2017).
Neapco, "2001 Power Take-Off Driveline Catalog", Catalog No. PTO 637, (available at https://www.neapcoaftermarket.com/wp-content/uploads/2019/11/2001ptocatalog637.pdf last accessed May 14, 2025).
Drivelinesplus_Offroadcenter (Instagram), Jun. 15, 2017 (available at https://www.instagram.com/p/BVW6OEPgrqe/ last accessed May 14, 2025).
Dana Spicer, "Light Axle Parts for Nissan Applications", Apr. 2013.
Rockford Drive Line, "CV Centering Assemblies", Aug. 2011.
Dana Spicer, "Companion Flanges J300P-1", (Nov. 2012) (available at https://d3qx1uccksbb2n.cloudfront.net/docs/j300-p1.pdf).
Drivelines Plus Inc (Facebook), Nov. 19, 2019.
Drivelines Plus Inc (Instagram), Nov. 19, 2019.
Affidavit of Inventor Jeff Everly dated Apr. 20, 2026.
Drivelinesplus_Offroadcenter (Instagram), Oct. 4, 2019 (available at https://www.instagram.com/p/B3N8Zh_hQal/?igsh=b2JsNWFla210OXQ0, last accessed Apr. 21, 2026).
Drivelines Plus Inc (Facebook), Oct. 5, 2019 (available at https://www.facebook.com/photo.php?fbid=2641148222609837&set=a.351214297009955&type=3#, last accessed Apr. 21, 2026).

* cited by examiner

TRANSFER CASE YOKE

CROSS-REFERENCE TO RELATED APPLICATIONS

This application is a continuation of U.S. patent application Ser. No. 17/500,547, filed Oct. 13 2021, which is incorporated by reference herein in its entirety.

BACKGROUND

This specification relates to drivetrains. More specifically, the present technology is in the technical field of transfer case output yokes for a four-wheel drive vehicle.

The drivetrain of a motor vehicle consists of various components that deliver power to the driving wheels, and, more particularly, the function of the drivetrain is to couple the engine that produces the power to the driving wheels that use the mechanical power to rotate one or both of the axles. Connecting these components, which may be spaced apart relative to other components, including the driving wheels, requires the use of driveshafts to transfer the power. These various components making up the complex drivetrain vary greatly across types of vehicles, along with makes and models of vehicles. As such, aftermarket parts, or replacement parts, not made by the original equipment manufacturer, must be tailored specifically for use with a particular make and model of vehicle.

A lift kit is a set of aftermarket parts used to lift the body of a vehicle and provide greater ground clearance. The lift kit may include only a few components, such as, for example, lift blocks, shocks, driveshafts, etc., or, for more extensive lifts, the lift kit may require suspension, steering, and drivetrain parts. Since the lift kit is comprised of various aftermarket parts, the manufacturer of these lift kits, along with the manufacturer of various other replacement parts, will have to produce a number of different aftermarket parts that are compatible with the make and model of vehicle for which they are designed.

For lift kits and various other vehicle components or parts, the manufacturer of these replacement parts must continually update parts to match those of the original equipment manufacturer, which are frequently changing. That is, when any original equipment manufacturer parts change, the corresponding aftermarket parts need to change accordingly.

The present technology addresses deficiencies in the current state of drivetrain technology.

SUMMARY

This specification relates to the field of vehicle drivetrains. More specifically, the present technology is in the technical field of aftermarket components for vehicle drivetrains.

In one aspect, a yoke for a transfer case output shaft a hollow cylindrical sleeve portion, which includes a plurality of inwardly extending splines formed on an inner surface of the hollow cylindrical sleeve portion. The inwardly extending splines are configured to engage with outwardly extending splines of the transfer case output shaft. A disc-shaped flange portion extending radially from an outer portion of the hollow cylindrical sleeve portion. The disc-shaped flange portion has a plurality of fastener openings therethrough, where the fastener openings of the disc-shaped flange portion correspond in size and location with a plurality of fastener openings through a flange portion of a companion flange. In an assembled configuration, the transfer case output shaft, yoke and companion flange rotate together. The yoke includes a notch through the hollow cylindrical sleeve portion at an end of the hollow cylindrical sleeve portion, a groove formed within the inner surface of the hollow cylindrical sleeve portion and extending about a rotation axis of the hollow cylindrical sleeve, and a C-clip received within the groove for restricting axial movement relative to the rotation axis, where the open ends of the C-clip are received within the notch. A threaded fastener passes through an opening of at least one of the yoke and the companion flange and engages the transfer case output shaft.

In another aspect, a yoke for a transfer case output shaft a hollow cylindrical sleeve portion, which includes a plurality of inwardly extending splines formed on an inner surface of the hollow cylindrical sleeve portion. The inwardly extending splines are configured to engage with outwardly extending splines of the transfer case output shaft. A disc-shaped flange portion extending radially from an outer portion of the hollow cylindrical sleeve portion. The disc-shaped flange portion has a plurality of fastener openings therethrough, where the fastener openings of the disc-shaped flange portion correspond in size and location with a plurality of fastener openings through a flange portion of a companion flange. In an assembled configuration, the transfer case output shaft, yoke and companion flange rotate together. The yoke includes a notch through the hollow cylindrical sleeve portion at an end of the hollow cylindrical sleeve portion, a groove formed within the inner surface of the hollow cylindrical sleeve portion and extending about a rotation axis of the hollow cylindrical sleeve, and a C-clip received within the groove for restricting axial movement relative to the rotation axis, where the open ends of the C-clip are received within the notch. The cylindrical sleeve portion of the companion flange includes at least two radial passages configured for receiving set screws that engage the transfer case output shaft when the transfer case output shaft is threadably received through the companion flange. The yoke is installed in combination with a lift kit for a vehicle having a first driveshaft angle articulation, where the lift kit provides a second driveshaft angle articulation greater than the first driveshaft angle articulation after components of the lift kit and the yoke are installed on the vehicle.

In yet another aspect, a yoke for a transfer case output shaft a hollow cylindrical sleeve portion, which includes a plurality of inwardly extending splines formed on an inner surface of the hollow cylindrical sleeve portion. The inwardly extending splines are configured to engage with outwardly extending splines of the transfer case output shaft. A disc-shaped flange portion extending radially from an outer portion of the hollow cylindrical sleeve portion. The disc-shaped flange portion has a plurality of fastener openings therethrough, where the fastener openings of the disc-shaped flange portion correspond in size and location with a plurality of fastener openings through a flange portion of a companion flange. In an assembled configuration, the transfer case output shaft, yoke and companion flange rotate together. The yoke includes a notch through the hollow cylindrical sleeve portion at an end of the hollow cylindrical sleeve portion, a groove formed within the inner surface of the hollow cylindrical sleeve portion and extending about a rotation axis of the hollow cylindrical sleeve, and a C-clip received within the groove for restricting axial movement relative to the rotation axis, where the open ends of the C-clip are received within the notch. The transfer case output shaft is configured to receive a bolt axially therethrough and fasten to the transfer case. The yoke is installed in combination with a lift kit for a vehicle having a first driveshaft angle articulation, where the lift kit provides a second driveshaft angle articulation greater than the first driveshaft angle articulation after components of the lift kit and the yoke are installed on the vehicle.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like element.

DETAILED DESCRIPTION

Before the present methods, implementations, and systems are disclosed and described, it is to be understood that this invention is not limited to specific methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

Figure 1:
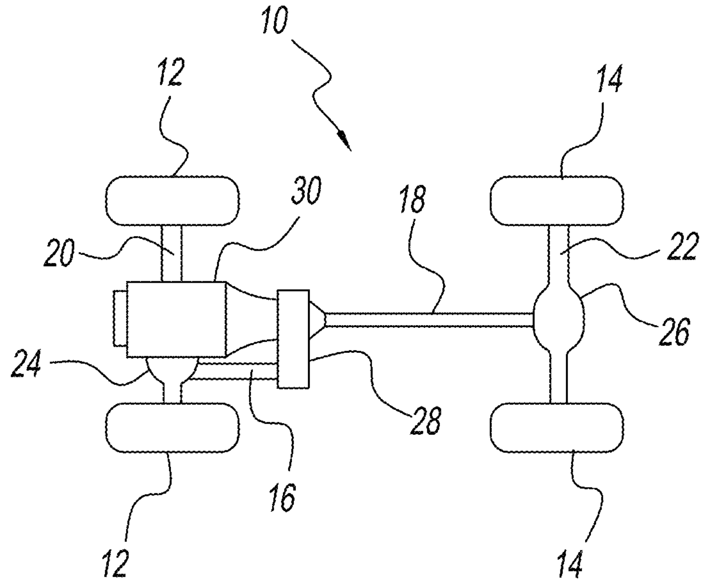
FIG. 1 depicts a high level diagram of an exemplary drivetrain, according to the present disclosure.

FIG. 1 depicts a high-level exemplary drivetrain schematic 10 according to the present disclosure. The function of the drivetrain 10 is to couple the engine (not shown) that produces power to rotate front driving wheels 12 and rear driving wheels 14 via front and rear driveshafts 16 and 18 and front and rear axle assemblies 20 and 22.

The exemplary drivetrain 10 also includes two differentials 24 and 26 and a transfer case 28. One differential 24 is located between the front two wheels 12 and the other differential 26 is located between the rear two wheels 14. The differentials send torque from the engine and a transmission 30 to the drive wheels 12 and 14 via the transfer case 28, driveshafts 24 and 28 and differentials 24 and 26. The transfer case 28 splits the power between the front and rear axle assemblies 20 and 22 of four-wheel-drive vehicles.

Figure 2:
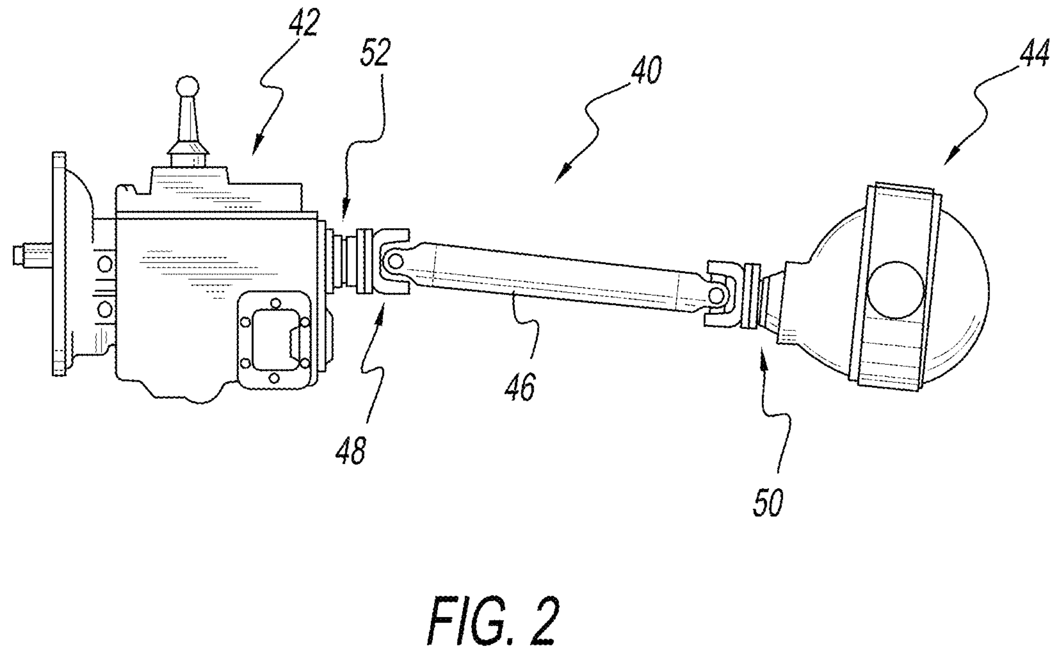
FIG. 2 depicts a portion of an exemplary drivetrain, including a transfer case outlet, yoke and driveshaft, according to the present disclosure.

FIG. 2 shows a portion of a driveshaft assembly 40, whose components may operate similarly to those described in FIG. 1, between a transfer case 42 and an axle assembly 44. A driveshaft 46 is coupled to the transfer case 42 via an output assembly 48 and is coupled to the axle assembly 44 via an input assembly 50.

The transfer case 42 transfers power from a transmission to front and rear axles, including axle assembly 44, using drive shafts, such as driveshaft 46. The transfer case 42 has an output shaft 52 that is connected to an input shaft (not shown) of the axle assembly 44 through the driveshaft assembly 40. The transfer case 42 is rotatably driven by the transmission, which is driven by an engine. The driveshaft assembly 40 includes a cylindrical driveshaft tube 46 having a center portion and a pair of opposed end portions.

Figure 3:
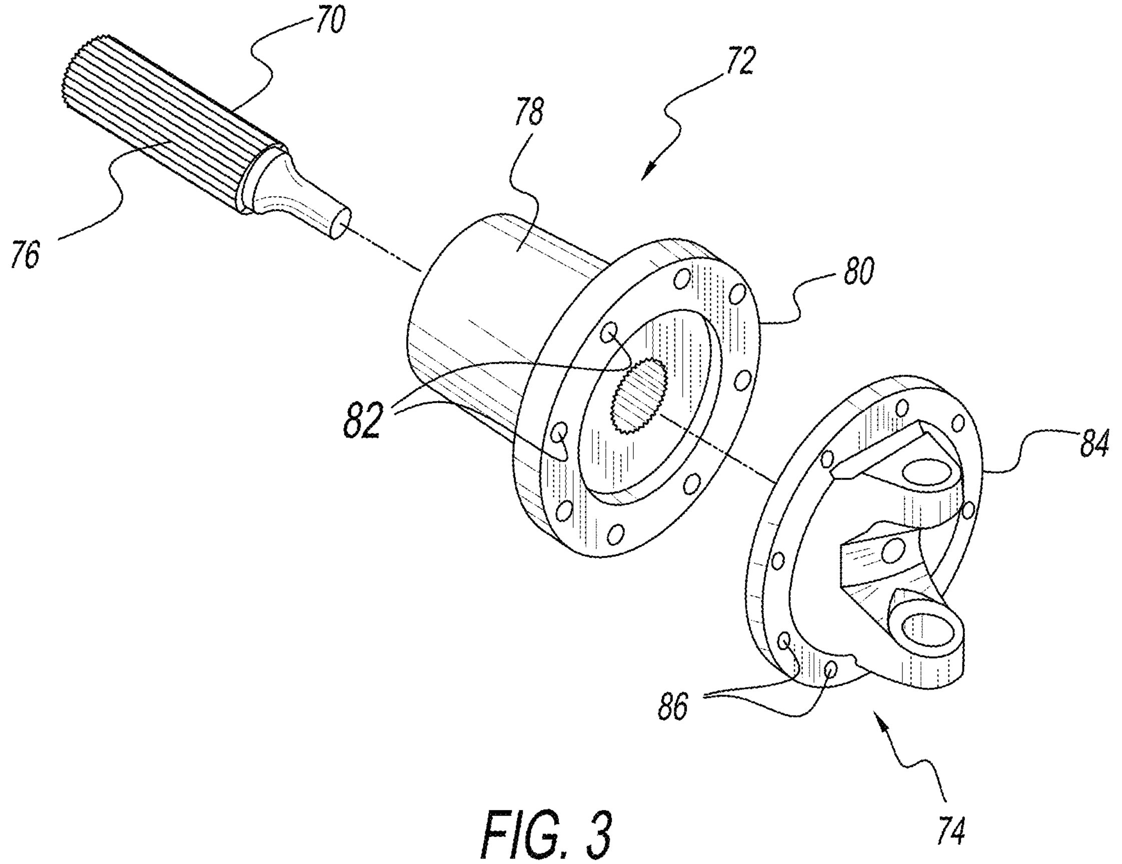
FIG. 3 depicts an exploded view of a transfer case output shaft, the yoke, and companion flange, according to the present disclosure.

FIG. 3 depicts an exploded view of a transfer case output shaft 70, a yoke 72, and a companion flange 74. The companion flange 74 mates with the yoke 72, also referred to as a flange yoke that, in turn, is supported on a male splined shaft 76, which is an output shaft of the transfer case 42. As used herein, splines are ridges or teeth on a driveshaft that mesh with splines in a mating piece and transfer torque to it. The yoke 72 includes a female splined sleeve portion 78 that cooperates with the male splined shaft 76 and a disc-shaped flange portion 80 that extends radially from an outer portion of the hollow cylindrical sleeve portion 78. The disc-shaped flange portion 80 has a plurality of fastener openings 82 formed therethrough.

The companion flange 74 includes a flange portion 84 that has a plurality of apertures 86 formed therethrough that correspond generally in size and location with the plurality of apertures 82 formed through the flange portion 80 of the yoke 72. When the flange portion 80 of the yoke 72 is disposed adjacent the flange portion 84 of the companion flange 74, fasteners may be positioned through the apertures 82 and 86 to secure positioning of the components. The companion flange 74 allows connection of a flange yoke 72 to another type of connection, for torque transfer.

Figure 4:
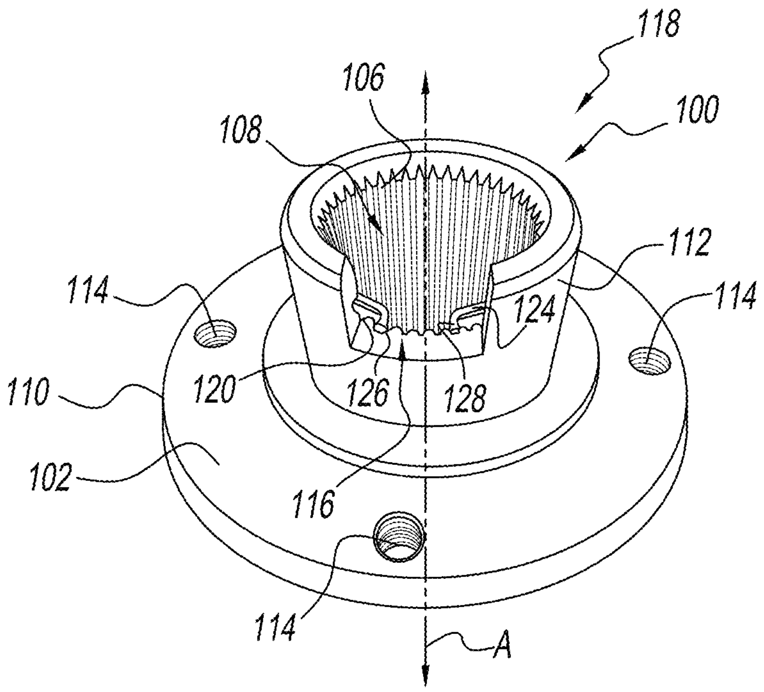
FIG. 4 depicts a perspective view of an exemplary yoke, according to the present disclosure.
Figure 5:
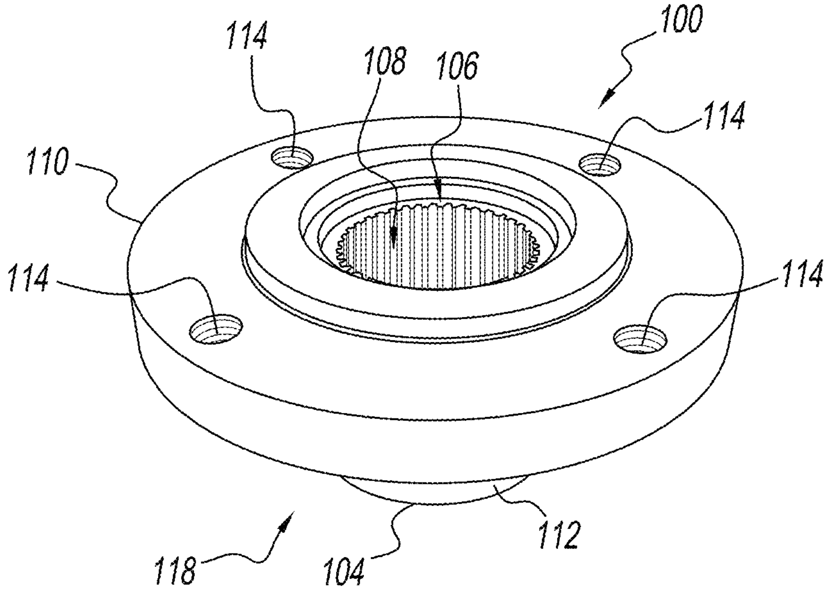
FIG. 5 depicts another perspective view of the exemplary yoke of FIG. 4, according to the present disclosure.

FIGS. 4 and 5 show different perspective views of an exemplary yoke 100, according to the present disclosure. The yoke 100 includes a hollow cylindrical sleeve portion 104 including a plurality of inwardly extending splines 106 formed on an inner surface 108 of the hollow cylindrical sleeve portion 104. The inner surface 108 of the hollow cylindrical portion 104 has a splined portion where the inwardly extending splines 106 extend from and an inlet portion sloped radially inward at least partially from an inlet of the female cylindrical sleeve to the splined portion such that a diameter of inlet portion is greatest at in inlet to the female cylindrical sleeve. The inwardly extending splines 106 are configured to engage outwardly extending splines of the transfer case output shaft (shown in previous FIG). According to the exemplary embodiment, the hollow cylindrical sleeve portion 104 includes forty-two (42) inwardly extending splines 106 for engaging with a corresponding number of outwardly extending splines of the transfer case output shaft.

The exemplary yoke 100 also includes a disc-shaped flange portion 110 that extends radially from an outer portion 112 of the hollow cylindrical sleeve portion 104. The disc-shaped flange portion 110 has a plurality of fastener openings 114 therethrough. The number, size and location of the apertures 114 may match the number, size and location of apertures of the flange portion of the companion flange. According to a specific embodiment, the disc-shaped flange portion 110 includes four (4) fastener openings 114 spaced around a circumference region of a face of the disc-shaped flange portion 110. Thus, when these components are assembled, the transfer case output shaft, yoke 100 and companion flange rotate together. The yoke 100 may further include a ring protruding from either or both opposite surfaces of the disc-shaped flange portion 110.

As shown, the yoke 100 includes a notch 116 formed through the hollow cylindrical sleeve portion 104 at one end 118 thereof. A groove 120 is formed within the inner surface 108 of the hollow cylindrical sleeve portion 104 and extends about an axis of rotation A. A C-clip 124 is received within the groove 120 for restricting axial movement relative to the rotation axis A. The two (2) free ends 126 and 128 of the C-clip 124 are received within the notch 116.

To strengthen the drivetrain components, or arrangement, described herein, and as discussed with reference to FIGS. 6-8, a threaded fastener may pass through an opening of at least one of the yoke 100 and the companion flange 74 and engage the transfer case output shaft 140.

Figure 6:
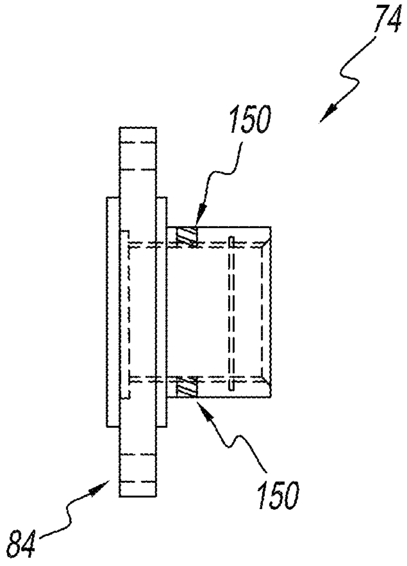
FIG. 6 is an engineering print of the companion flange of FIG. 3, according to an embodiment of the present disclosure.
Figure 7:
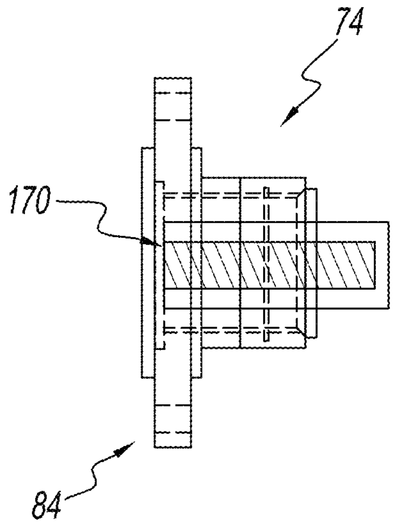
FIG. 7 is an engineering print of the companion flange of FIG. 3, according to an another embodiment of the present disclosure.
Figure 8:
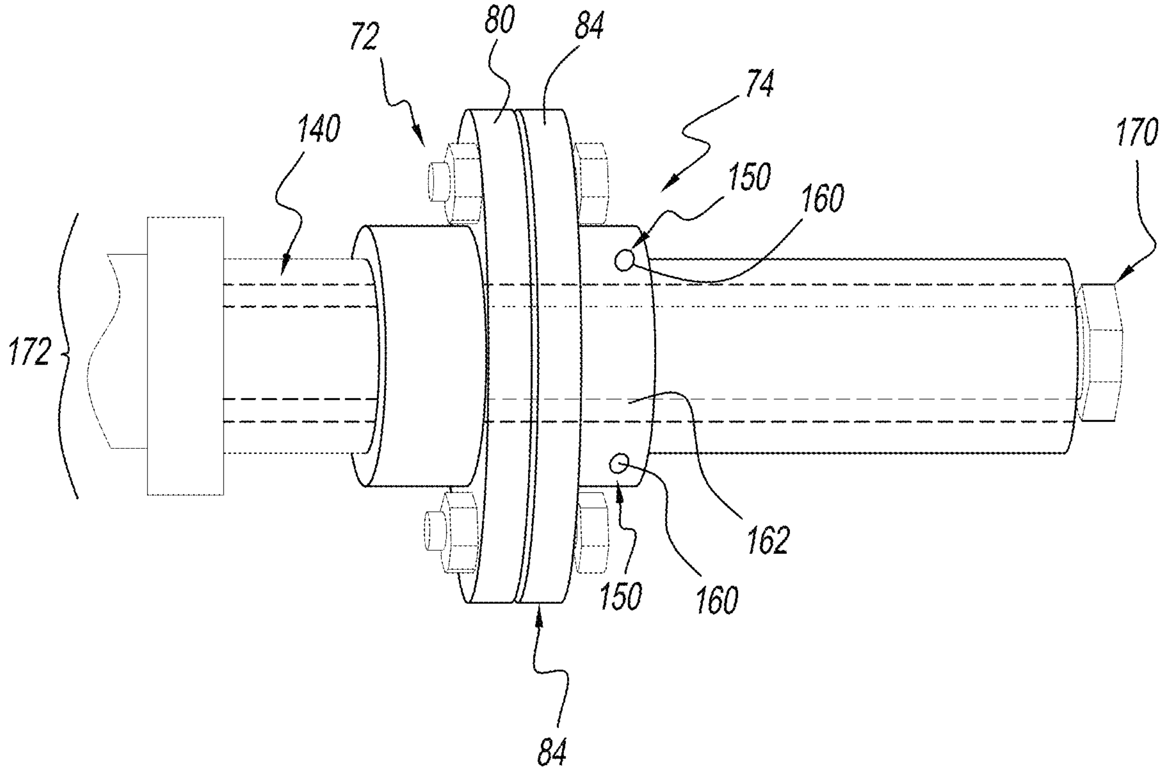
FIG. 8 is a perspective view of a portion of an exemplary drivetrain, including a transfer case, transfer case outlet shaft, yoke, companion flange, and driveshaft, including the features of FIGS. 6 and 7.

FIGS. 6-8 show the companion flange 74 of FIG. 3, according to an exemplary embodiment of the present disclosure. The companion flange 74 includes a flange portion 84 that has a plurality of apertures 86 formed therethrough that correspond generally in size and location with the plurality of apertures 82 formed through the flange portion 80 of the yoke 72. When the flange portion 80 of the yoke 72 is disposed adjacent the flange portion 84 of the companion flange 74, fasteners may be positioned through the apertures 82 and 86 to secure positioning of the components. The companion flange 74 allows connection of a flange yoke 72 to another type of connection, for torque transfer.

According to the exemplary embodiment, the cylindrical sleeve portion 162 of the companion flange 74 includes at least two radial passages 150 (FIG. 6) configured for receiving set screws 160 (FIG. 8) that engage the transfer case output shaft 140 when the transfer case output shaft 140 is threadably received through the companion flange 72, wherein the two radial passages 150 are positioned on opposing sides about a circumference, or outer diameter, of the cylindrical sleeve portion 162 of the companion flange 74. Although specific locations for the set screws 160 are described, alternative locations may also be used.

According to a specific embodiment, the radial passages 150 and set screws 160 may be introduced using a drill and tap method. Drilling refers to creating a smooth hole in a material with a drill and motor, while tapping is the action that creates a thread into the side of the hole. A variety of taps are available to match almost any screw type available, including metric and standard measurements. According to a specific example, the companion flange 74 can be drilled and tapped to 27/69 with ½ 13 threads. However, alternative dimensions and numbers of threads may also be used. Each set screw 160 may have a flat head, for example, and any of a variety of different tips may be used to engage the transfer case output shaft 140. Further, the set screws 160 may be made from any of a variety of strong materials.

FIG. 7 shows the companion flange 74, according to another embodiment of the present disclosure, wherein the transfer case output shaft 140 is configured to receive a bolt 170 axially therethrough (i.e., along the longitudinal axis of the transfer case output shaft 140), which is fastened to the transfer case 172. One way, for example, is to drill and tap the center to 19/64 with a ½ 20 thread. The drilling and tapping for the bolt 170 may be carried out as described above with reference to the set screws 160.

FIG. 8 is a perspective view of a portion of an exemplary drivetrain, including a transfer case 172, transfer case outlet shaft 140, yoke 100, companion flange 74, and driveshaft, including the components and features of FIGS. 6 and 7. This embodiment includes both features of FIGS. 6 and 7. The cylindrical sleeve portion 162 of the companion flange 74 includes at least two radial passages 150 configured for receiving set screws 160 that engage the transfer case output shaft 140 when the transfer case output shaft 140 is threadably received through the companion flange 74; and wherein the transfer case output shaft 140 is configured to receive a bolt 170 axially therethrough and fasten to the transfer case 172. The bolt 170 can attach to any component of the transfer case.

The transfer case yoke of the present disclosure meshes with a transfer case output shaft, as described above, and, therefore, rotates with the transfer case output shaft. The C-clip is positioned in a groove of the yoke to limit axial movement of the respective components. The disc-shaped flange portion of the yoke may be aligned with and fastened to the flange portion of a companion flange, thus enabling the companion flange to rotate with the yoke and the transfer case output shaft to transfer torque. The window, or access opening, of the yoke receives the free ends of the C-clip therethrough.

Although the yoke described herein may have broad applicability, it is presented in the context of a replacement part for 2019 Dodge Rams 2500, 3500, 4500 and 5500.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A yoke for a transfer case output shaft, including:
a hollow cylindrical sleeve portion;
wherein the hollow cylindrical sleeve portion includes a plurality of inwardly extending splines formed on an inner surface of the hollow cylindrical sleeve portion;
wherein the inwardly extending splines are configured to engage with outwardly extending splines of the transfer case output shaft;
a disc-shaped flange portion extending radially from an outer portion of the hollow cylindrical sleeve portion;
wherein the disc-shaped flange portion has a plurality of fastener openings therethrough;
wherein the fastener openings of the disc-shaped flange portion correspond in size and location with a plurality of fastener openings through a flange portion of a companion flange;
wherein, in an assembled configuration, the yoke is configured to rotate together with the companion flange and the transfer case output shaft;

a notch through the hollow cylindrical sleeve portion at an end of the hollow cylindrical sleeve portion;

a groove formed within the inner surface of the hollow cylindrical sleeve portion and extending about a rotation axis of the hollow cylindrical sleeve portion; and a C-clip received within the groove for restricting axial movement relative to the rotation axis;

wherein open ends of the C-clip are received within the notch;

wherein a threaded fastener passes through an opening of the yoke and is configured to engage the transfer case output shaft.

2. The yoke of claim 1, wherein the cylindrical sleeve portion of the companion flange includes at least two radial passages configured for receiving set screws that engage the transfer case output shaft when the transfer case output shaft is threadably received through the companion flange.

3. The yoke of claim 2, wherein the two radial passages are positioned on opposing sides about a circumference of the cylindrical sleeve portion of the companion flange.

4. The yoke of claim 1, wherein the transfer case output shaft is configured to receive a bolt axially therethrough and fasten to the transfer case.

5. The yoke of claim 1, wherein:

the cylindrical sleeve portion of the companion flange includes at least two radial passages configured for receiving set screws that engage the transfer case output shaft when the transfer case output shaft is threadably received through the companion flange; and wherein the transfer case output shaft is configured to receive a bolt axially therethrough and fasten to the transfer case.

6. The yoke of claim 1, wherein the yoke is installed in combination with a lift kit for a vehicle having a first driveshaft angle articulation;

wherein the lift kit provides a second driveshaft angle articulation greater than the first driveshaft angle articulation after components of the lift kit and the yoke are installed on the vehicle.

7. The yoke of claim 1, wherein the hollow cylindrical sleeve portion includes forty-two (42) inwardly extending splines formed on the inner surface of the hollow cylindrical sleeve portion.

8. The yoke of claim 1, wherein the disc-shaped flange portion includes four fastener openings therethrough that are spaced about a circumference region of a face of the disc-shaped flange portion.

9. The yoke of claim 1, wherein the inner surfaces of the fastener openings through the disc shaped flange portion are threaded.

10. The yoke of claim 1, wherein an outer surface of the yoke is stepped along its longitudinal axis with an outer diameter being greatest at the disc-shaped flange portion.

11. A yoke for a transfer case output shaft in combination with a lift kit for a vehicle, comprising:

a female cylindrical sleeve having an inner surface comprising a plurality of inwardly extending splines, the inner surface comprising a splined portion and an inlet portion, the splined portion comprising the splines extending inwardly therefrom and the inlet portion being sloped radially inward at least partially from an inlet of the female cylindrical sleeve to the splined portion such that a diameter of inlet portion is greatest at a n inlet to the female cylindrical sleeve, the female cylindrical sleeve further configured to receive a male driveshaft with corresponding splines;

a disc-shaped flange having a first surface and a second surface opposite the first surface, the disc-shaped flange having a plurality of through-holes extending from the first surface to the second surface, wherein the female cylindrical sleeve extends axially from the first surface of the disc-shaped flange;

a ring protruding from either the first surface or the second surface of the disc-shaped flange, the female cylindrical sleeve, the disc shaped flange and the ring have a passage extending completely therethrough;

a c-clip comprising a body and two free ends;

a notch formed in the splined portion of the inner surface of the female cylindrical sleeve; and a groove formed circumferentially in the splined portion of the inner surface of female cylindrical sleeve, the groove configured to receive the body of the c-clip and the notch configured to receive the free ends of a c-clip, wherein the female cylindrical sleeve, the disc-shaped flange and the ring collectively have a stepped outer surface.

12. The yoke of claim 11, wherein the splined portion of the inner surface comprises a portion where the splines extend parallel with a rotational axis of the yoke, and a tapered portion where the splines are sloped inwardly to match the slope of the inlet portion of the inner surface.

13. The yoke of claim 11, wherein the notch is rectangular in shape.

14. The yoke of claim 11, wherein a diameter of an opening in the ring is greater than a diameter of the opening in the second surface of the disc-shaped flange.

15. An assembly comprising the yoke of claim 11, further comprising a male driveshaft inserted into the inlet of the female cylindrical sleeve, wherein the driveshaft is restricted axially with respect to the female cylindrical sleeve by the c-clip.

16. The yoke of claim 11, wherein the inlet portion extends completely from the inlet of the female cylindrical sleeve to the splined portion.

17. The yoke of claim 11, wherein the yoke is installed in combination with a lift kit for a vehicle.

18. The yoke of claim 11, wherein a second ring protrudes from one of the first surface and the second surface opposite the surface from which the ring protrudes.

19. A yoke for a transfer case output shaft in combination with a lift kit for a vehicle, including:

a female cylindrical sleeve;

wherein a plurality of inwardly extending splines protrude from an inner surface of the female cylindrical sleeve;

wherein the inwardly extending splines are configured to engage with outwardly extending splines of the transfer case output shaft;

a disc-shaped flange portion extending radially from an outer portion of the female cylindrical sleeve;

wherein the disc-shaped flange portion has a plurality of fastener openings extending from a first surface of the disc-shaped flange to a second surface of the disc-shaped portion;

wherein an outer surface of the yoke is stepped along its longitudinal axis with an outer diameter being greatest at the disc-shaped flange portion;

wherein each of the fastener openings of the disc-shaped flange portion is configured to mate with a plurality of respective fastener openings through a flange portion of a companion flange;

wherein, in an assembled configuration, the transfer case output shaft, yoke and companion flange rotate together;

a notch through the female cylindrical sleeve at an end of the female cylindrical sleeve;

a groove formed in a circumferential direction along the inner surface of the female cylindrical sleeve; and a C-clip received within the groove configured to prevent axial movement in one axial direction;

wherein open ends of the C-clip are received within the notch;

wherein the yoke is installed in combination with a lift kit for a vehicle having a first driveshaft angle articulation;

wherein the lift kit provides a second driveshaft angle articulation greater than the first driveshaft angle articulation after components of the lift kit and the yoke are installed on the vehicle.

* * * * *